United States Patent
Furrer et al.

(10) Patent No.: US 7,500,817 B2
(45) Date of Patent: Mar. 10, 2009

(54) AGRICULTURAL SEED TENDER WITH MODULAR STORAGE CONTAINERS

(75) Inventors: G. Jason Furrer, N. Remington, IN (US); Todd W. Kaeb, Loda, IL (US); Steven R. Walder, Hoopeston, IL (US)

(73) Assignee: KSI Conveyors, Inc., Cissna Park, IL (US)

( * ) Notice: Subject to any disclaimer, the term of this patent is extended or adjusted under 35 U.S.C. 154(b) by 305 days.

(21) Appl. No.: 11/348,659

(22) Filed: Feb. 7, 2006

(65) Prior Publication Data

US 2006/0180062 A1    Aug. 17, 2006

Related U.S. Application Data

(60) Provisional application No. 60/653,876, filed on Feb. 16, 2005.

(51) Int. Cl.
| | |
|---|---|
| B65F 1/00 | (2006.01) |
| B65F 3/00 | (2006.01) |
| B65G 41/00 | (2006.01) |
| B60P 1/00 | (2006.01) |
| G01F 11/10 | (2006.01) |

(52) U.S. Cl. .................. 414/522; 414/523; 222/371; 198/311; 198/312

(58) Field of Classification Search .............. 222/371; 198/312, 311; 414/523, 522
See application file for complete search history.

(56) References Cited

U.S. PATENT DOCUMENTS 4,503,803 A * 3/1985 Barnes .................. 118/303

* cited by examiner

*Primary Examiner*—Christopher J. Novosad
(74) *Attorney, Agent, or Firm*—Wildman, Harrold, Allen & Dixon LLP

(57) ABSTRACT

A trailer having support wheels and a frame adapted to be hitched to a truck, includes a support track extending longitudinally for supporting an unload conveyor. The conveyor is mounted by a turret to the support track and, thus, to the trailer frame, permitting the turret to move in a fore-to-aft direction, as well as to rotate about the vertical for about 180°, providing flexibility in use as well as transport and storage. A support module, carrying at least one storage container is mounted on the trailer frame. The storage containers may be provided in a number of different sizes and they may be arranged in various configurations suiting the user's needs. The turret is positioned along the track beneath a desired seed container, which may then be unloaded by the conveyor to fill a planter seed box or grain drill, or for other seed handling applications.

9 Claims, 10 Drawing Sheets

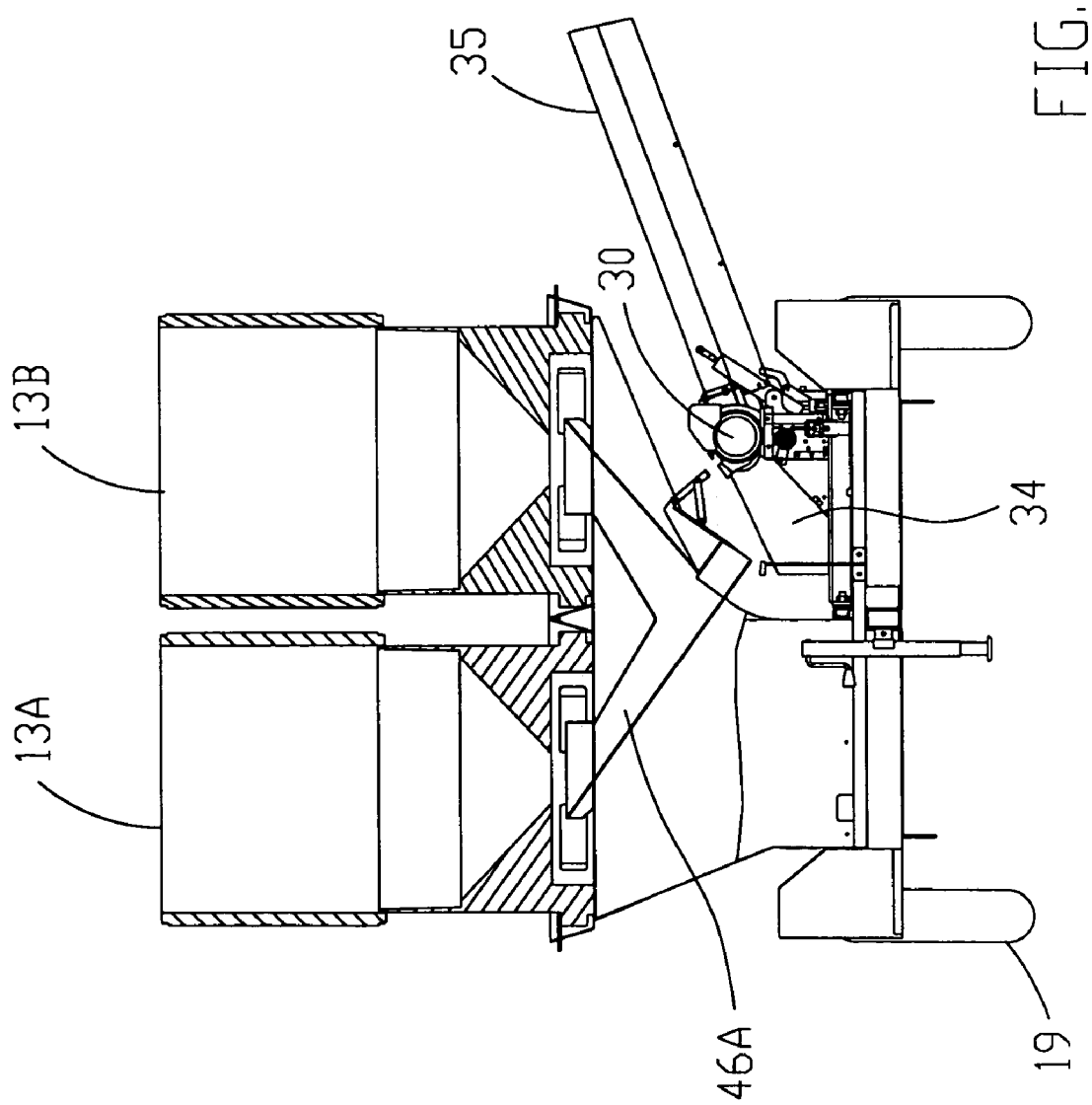

AGRICULTURAL SEED TENDER WITH MODULAR STORAGE CONTAINERS

RELATED APPLICATION

This application claims benefit under 35 U.S.C. '120 of U.S. application Ser. No. 60/653,876, filed Feb. 16, 2005, for "BULK SEED TENDER".

FIELD OF THE INVENTION

The present invention relates to apparatus for handling agricultural seed in bulk form. In particular, it relates to a trailer or wheeled tender adapted to be pulled by a vehicle such as a truck, and containing seed in bulk form or stored in large, heavy containers, primarily for supplying agricultural row crop planters or grain drills or the like, with seed, although it may be used for other seed handling applications as well.

BACKGROUND OF THE INVENTION

The term "planters" as used herein, it is intended to include all types of planting machines, such as row crop planters, grain drills and any other seed planting devices. As planters become larger and larger, the seed storage hoppers or containers on modern planters have also become larger in capacity such that currently, a large agricultural planter is capable of storing seed in quantities which are of considerable weight, and there have been many attempts to mechanize the filling and refilling of planter hoppers or seed bins with seed. Mechanized filling of seed hoppers or bins saves considerable time during the planting season, when time is at a premium.

Most prior attempts to provide a seed supply tender for a planter have been limited to a single type of seed at a given time, or to a single type of seed container. Such attempts are limited in that a farmer may use the same planter to plant different varieties of seed in the same field. Bulk seed for popular commercial crops such as corn and soy beans is now distributed in large boxes, tanks or seed bags, depending upon the producer of the seed and the quantity and volume of seed being transferred. The weight of the containers requires powered lifts for handling.

It is thus desirable to have a seed tender which is not only portable and adaptable to the various situations found in different farms and areas, but which is capable of handling large volumes and considerable weight of seed, and which is also capable of carrying seed containers of different volumes and/or configurations, for maximum flexibility. Further, by accommodating a larger number of seed containers on the seed tender, a problem arises in mechanizing the distribution of seed from the various containers, particularly as they are located in different places on a tender, as well as having the vehicle accommodate containers of different configurations.

SUMMARY OF THE INVENTION

The present invention includes a trailer having support wheels and a frame adapted to be hitched to a truck. The trailer frame includes a guide/support track extending longitudinally of the trailer. As used herein, "longitudinal" refers to the direction of travel of the trailer. "Transverse" refers to the side-to-side direction relative to the direction of travel.

A conveyor is mounted to the track by a turret rotatable about a vertical axis. Preferably the turret is located to one side of the trailer, and the turret and conveyor move beneath the seed storage bins. This arrangement permits the turret to move in a longitudinal direction so as to unload seed under gravity from containers located above the conveyor inlet and either in a forward or a rear position on the trailer. In this manner, the forward and rear seed containers need not be the same container size or configuration. For example, one could be a relatively large bin extending the full width of the trailer, whereas the others could be two smaller containers, located side-by-side, and having a combined width equal to the width of the larger container, depending upon the manner in which the distributor or seed manufacturer elects to ship and transport the seed.

Thus, the conveyor is capable of moving along the track to different unload positions in a longitudinal direction. The storage containers may be provided in a number of different sizes, types, and configurations so that they may be arranged and adapted for particular containers, which better suit the user's needs and convenience.

The turret and conveyor inlet hopper are positioned to move longitudinally along the track, to be positioned beneath a desired larger container or beside two containers located side-by-side, which may then be unloaded by the conveyor to fill a planter box or grain drill, or for other seed handling applications.

The conveyor may be turned by the turret about its vertical axis between: (i) a side position for unloading seed, (ii) a forward position and extending forwardly wherein the conveyor is located between the sides of the trailer and in front of it, for transport, or (iii) to the rear and extending rearwardly, for unloading or transport. In any longitudinal positioning of the conveyor, the conveyor delivery tube may be raised or lowered as desired. This feature is convenient as well as economical because some planters, particularly larger ones, have storage hoppers which typically have an inlet opening higher than the conventional seed hoppers of, smaller or intermediate size row crop planters, for example. Moreover, this arrangement (i.e., raising or lowering the elevation angle of the tubular conveyor) permits the conveyor to be raised in the storage position, but lowered during delivery or use applications.

The ability to raise and lower the unload auger also permits grain containers or bins carried on a trailer to be mounted at a lower elevation, thus, lowering the center of gravity of the trailer and providing greater stability in transport, as well as during unloading. Further, the ability to raise the unload auger during unloading permits unloading to be accomplished at greater heights than heretofore using conventional techniques, thus utilizing the full advantage of a cleated belt conveyor such as disclosed in U.S. Pat. No. 6,170,649, issued Jan. 9, 2001. Moreover; the use of a powered conveyor to fill the planter hopper or seed bin improves seed storage capacity, as well as the ability to place the conveyor and its mount on flatbed semi-trailers, or other trailers. Thus, the end user may already own one of these types of trailers and does not, therefore, have to purchase a new trailer or truck having a special height requirement. In other words, the present invention permits not only flexibility in positioning and elevating the unload auger, but also permits the user to mount the structure on a variety of vehicles, including trailers or trucks of different height.

Other features and advantages of the present invention will be apparent to persons skilled in the art from the following detailed description of a preferred embodiment, accompanied by the attached drawing, wherein identical reference numerals will refer to like parts in the various views.

BRIEF DESCRIPTION OF THE DRAWINGS

FIG. 2 is a view similar to FIG. 1, but with two rear grain storage bins shown in cross section taken along a vertical transverse plane;

DETAILED DESCRIPTION OF THE ILLUSTRATED EMBODIMENT

Figure 1:
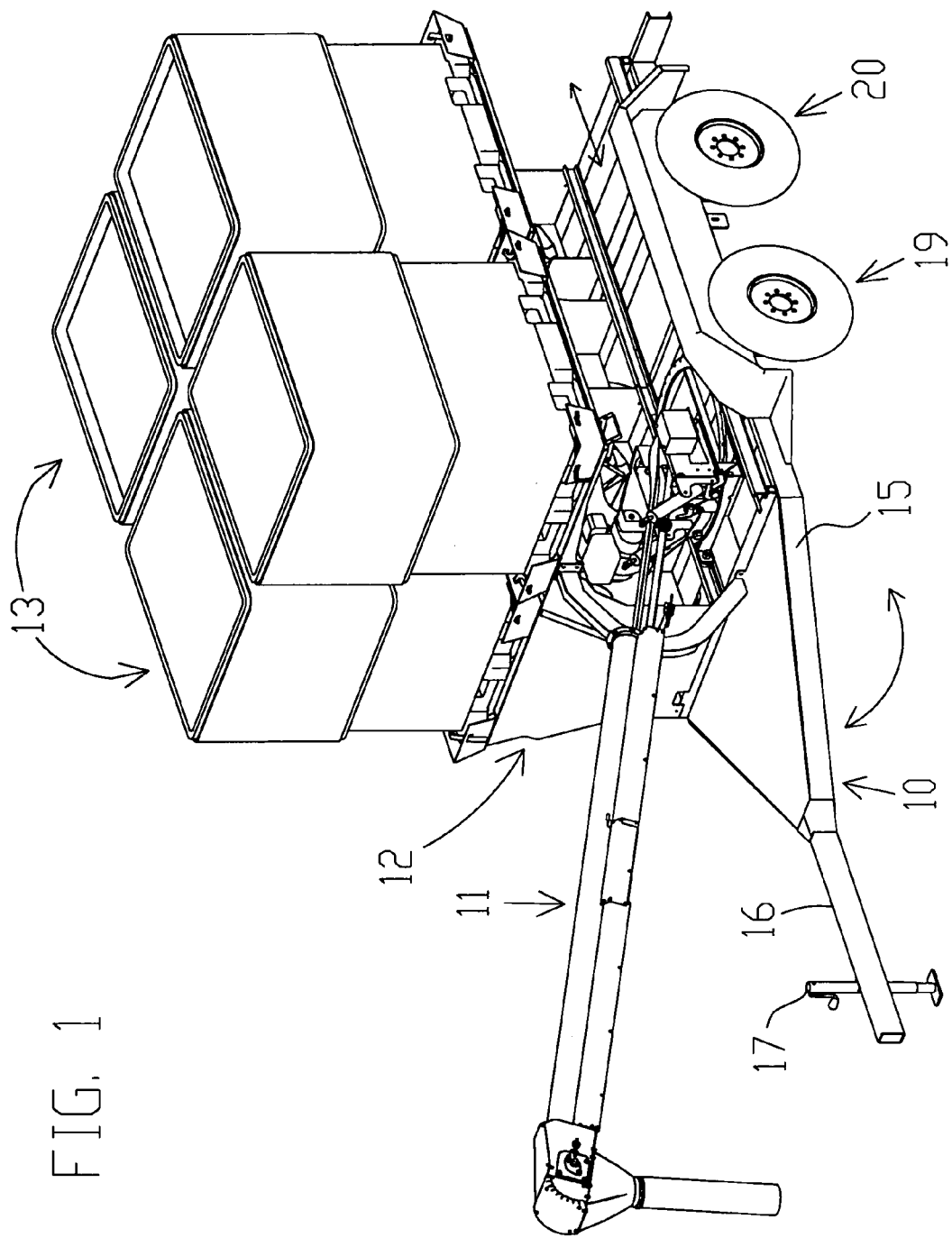
FIG. 1 is a right, front perspective view of a seed tender incorporating the present invention; taken from a front, left, upper view.
Figure 1A:
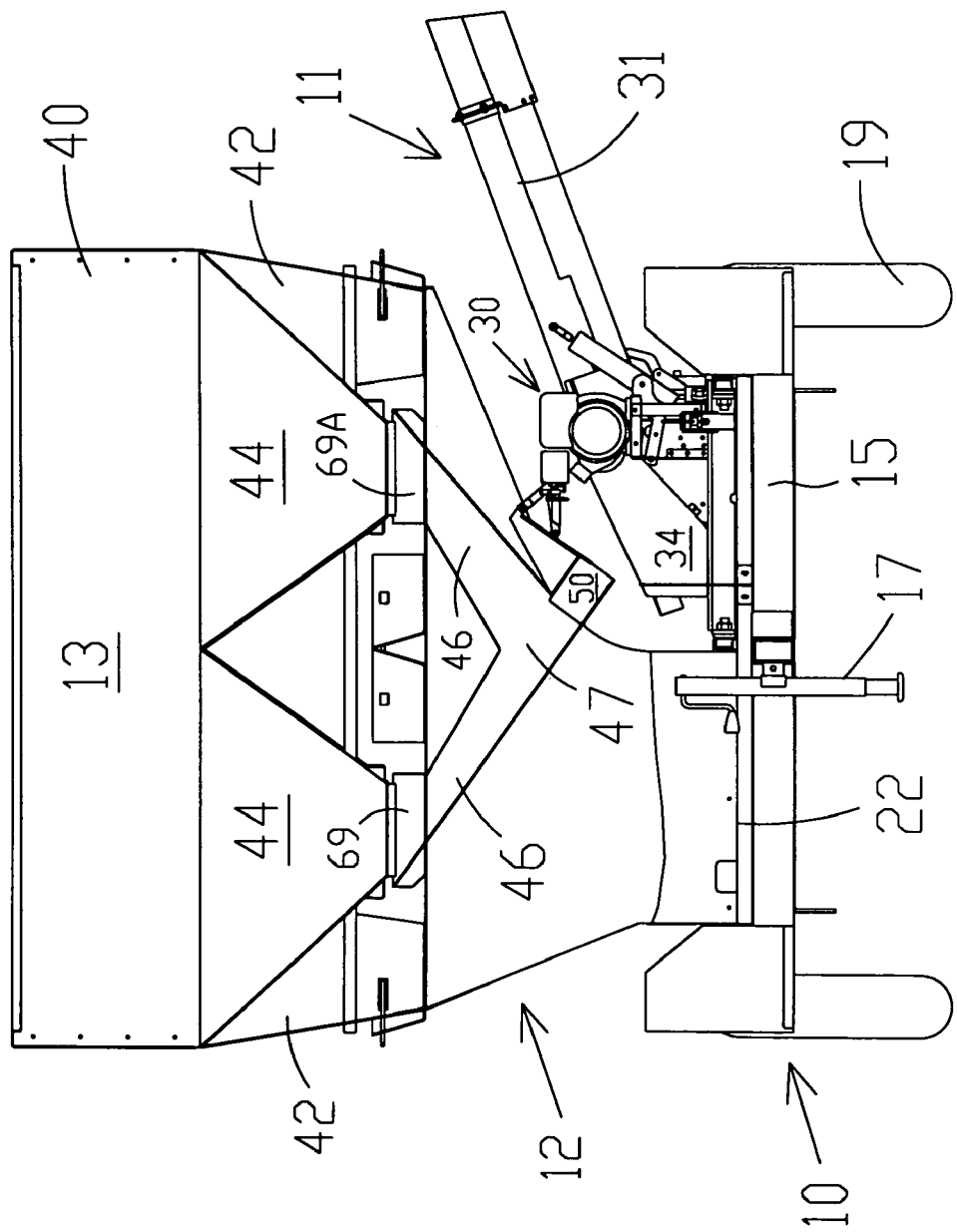
FIG. 1A is a front elevational view of a seed tender incorporating the present invention.
Figure 3:
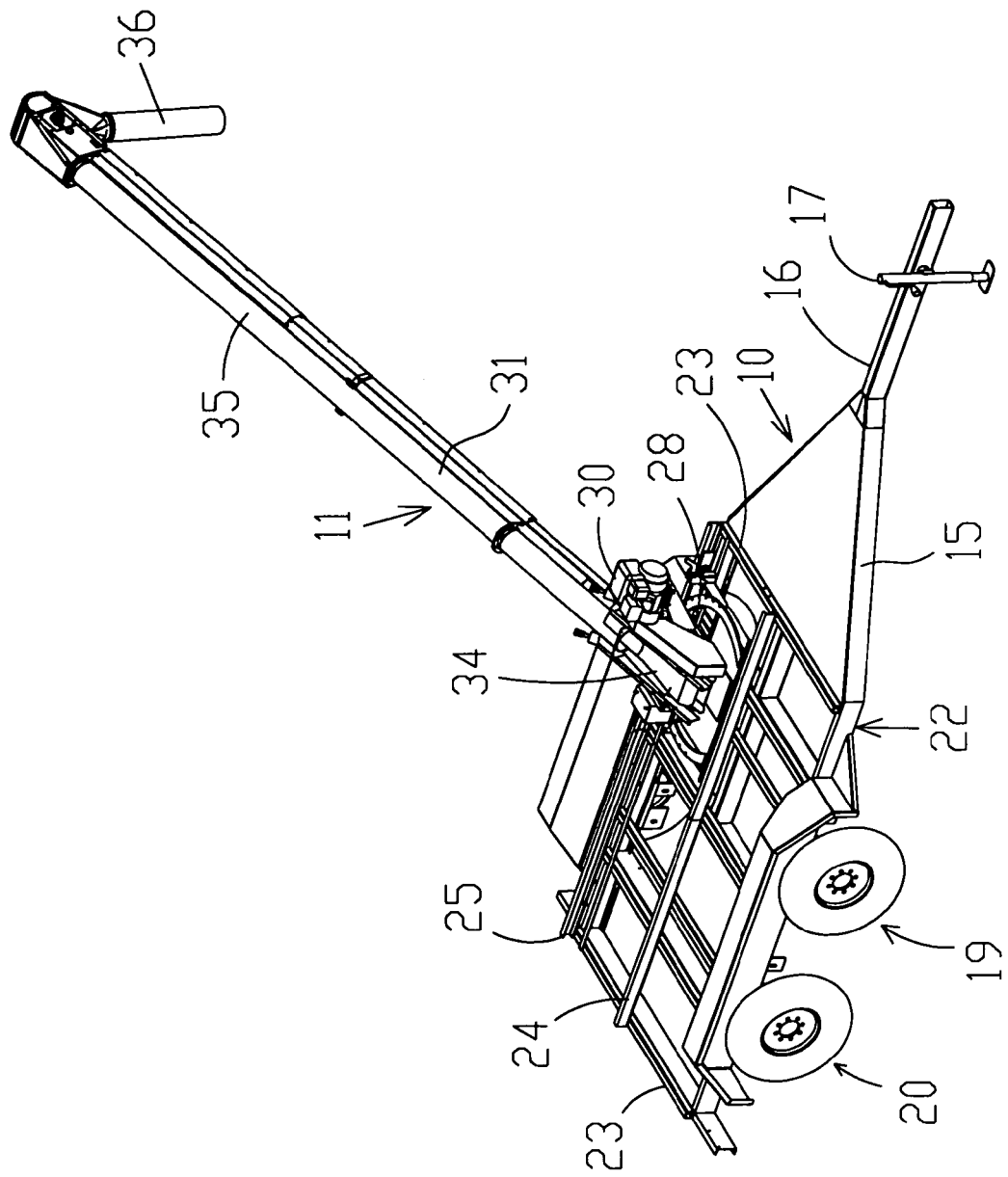
FIG. 3 is an upper, right perspective view of the trailer, the conveyor in the unload position, and the track system mounting the conveyor to the trailer frame.
Figure 4:
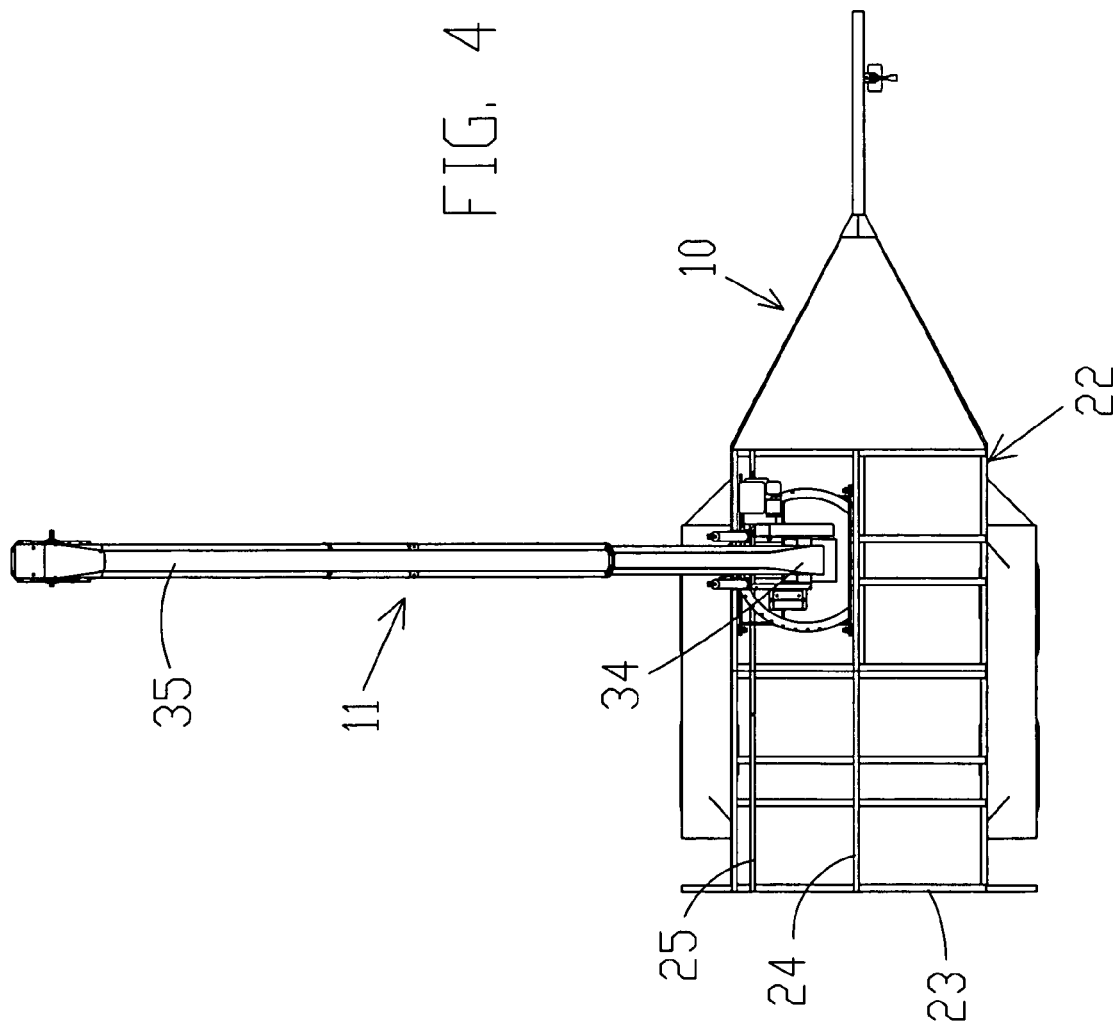
FIG. 4 is a plan view of the trailer and conveyor, without the seed bins.

Referring first to FIGS. 1, 1A and 3, the seed tender of the present invention includes a wheeled trailer generally designated 9, an unload conveyor generally designated 11 and located toward the left side of the trailer in FIG. 1A (when looking in the direction of travel), one or more seed bin modules generally designated 12 (FIG. 1), and at least one seed storage bin 13. As used herein, "bin" is intended to be construed broadly to include all manner of container, regardless of size, shape, configuration or material (including even flexible bags). Broadly speaking, the invention includes a seed bin module 12 and a support vehicle. In the illustrated embodiment, the support vehicle is shown as a trailer simply because a trailer might be provided by a manufacturer of the entire system. However, the support vehicle could be a truck, as well, adapted for supporting and securing the seed bin module, because the seed bin module is self-contained and not dependent upon the type of vehicle which transports and positions it.

Still referring to FIGS. 1 and 3, the trailer 9 may be of conventional design, including a frame 15 fitted with a draft tongue 16 carrying, if desired, a support stand 17. Pairs of forward and rear wheels designated 19, 20 respectively in FIG. 3, support the frame 15 as well as the seed bin module 12, comprising an unload conveyor 11, bin support modules 12, which serve as mounts for individual storage bins 13, as well as the contents of the seed storage bins, while permitting the trailer and its load to be pulled by a vehicle or truck.

Figure 7:
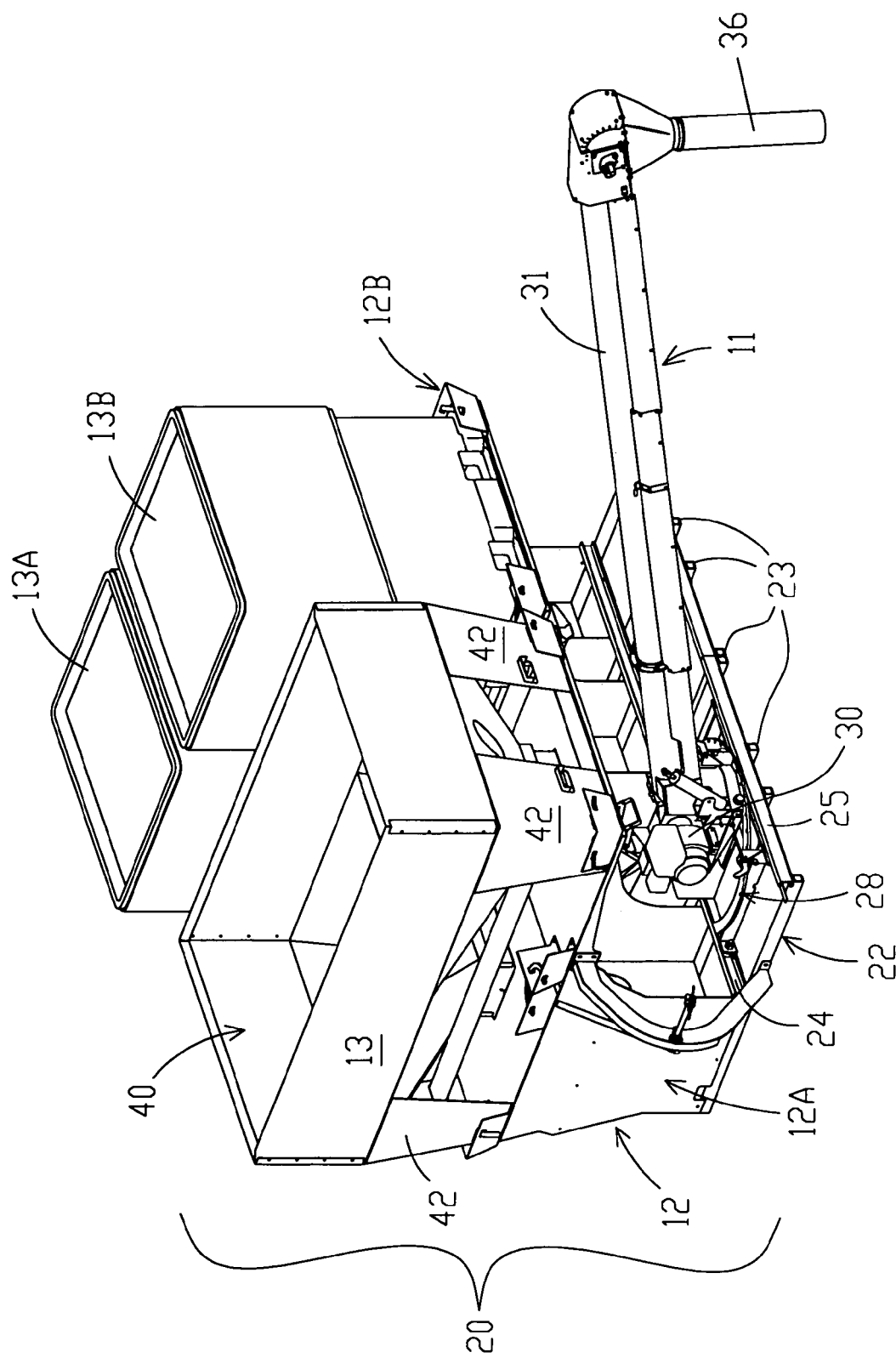
FIG. 7 is a perspective view similar to FIG. 5, but with two modular seed bin supports, located fore and aft of each other, and with different configurations of seed storage bins fore and aft.

The versatility and utility of the present invention may best be understood from FIGS. 1 and 7, to which reference is now made. A superstructure comprising one or more bin support modules, seen in FIG. 7, is mounted to the conventional frame 15 of the trailer 9. The superstructure, generally designated 20, includes a lower frame 22 including a series of transverse metal bars, which may be rectangular tubes, welded or otherwise affixed to the trailer frame 9. This provides a stable base for assembling and mounting the bin support modules. In FIG. 7, there are two bin support modules designated respectively 12A for the forward bin support module and 12B for the rear bin support module. These bin support modules may be identical even though the bins they support have different capacities. It will be appreciated that the forward hopper or storage bin module 13 is mounted to the forward bin support 12A whereas there are two bin modules 13A and 13B mounted to the rear bin support module 12B (compare FIGS. 1 and 2, for example). Both rear bins 13A, 13B are mounted to the rear bin support 12B, which in turn is mounted to the superstructure carrying frame 22 which, in turn, is secured to the main frame 9 of the trailer (or truck).

Figure 8:
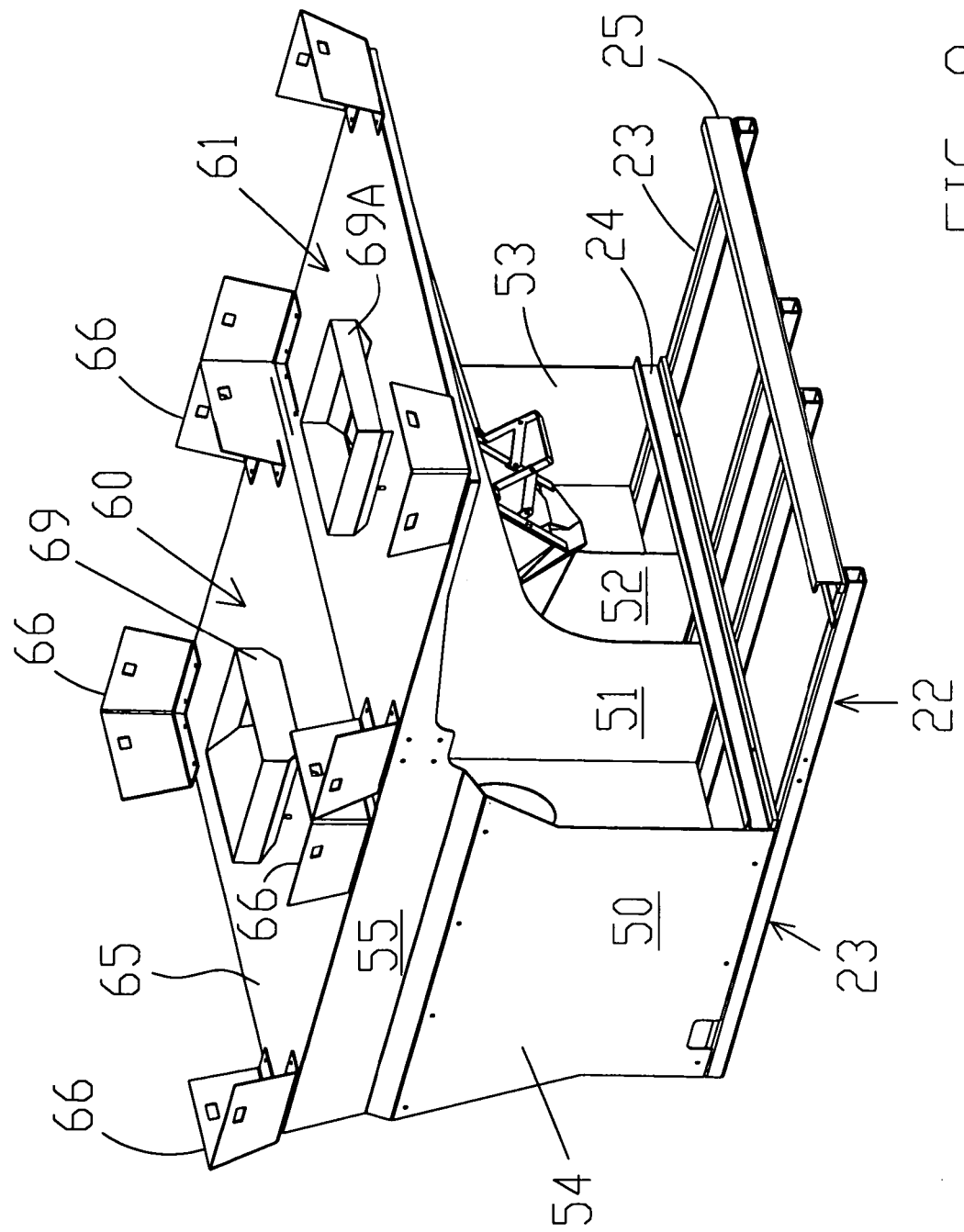
FIG. 8 is a close-up perspective view of a seed bin support structure for mounting two seed bins side-by-side on the trailer, taken from a forward, left and slightly elevated perspective.

A pair of metal rails 24, 25 (in the form of C-shaped channels as seen in FIG. 8) are welded to the transverse frame members 23 of the lower frame 22 to form a track for moving the conveyor along the length of the wheeled support vehicle. The conveyor 11 includes a turret mount 28 carried by a conventional mobile carrier, including a circular track, and seen best in FIG. 3, for traveling longitudinally along the track defined by the rails 24, 25. The unload conveyor 11 also includes a drive motor 30 which drives the belt of a conventional tube conveyor. For example, the tube, conveyor 11 may be of the type described in U.S. Pat. No. 6,675,958 issued Jan. 13, 2004 entitled ATube Conveyor. Although less desirable, the conveyor could be an auger. Briefly, the former preferred conveyor includes a tubular housing 31 in which the seed is moved by a cleated belt from an inlet hopper 34 (FIG. 3) through a conveyor tube 35 of closed cross section to a discharge tube 36. The turret mount 28, motor 30 and discharge tube 31 may be moved manually between a forward discharge position beneath the larger bin 13, as seen in FIG. 7, or rearwardly, along the rails 24, 25, to a rear discharge position beneath the rear bins 13A, 13B.

As best seen in FIG. 1, when the conveyor is in the forward position, it can be used either for transport or for unloading in a forward location. Alternatively, as seen in FIG. 7, the conveyor may be rotated to a wide range of angles, both vertical and horizontal, providing a flexible unload capability. See also FIG. 3. Finally, as will be appreciated, the turret can be moved to a rearward position, and the conveyor 11 may be rotated about a vertical axis to instill another wide range of unload, or rear-trailing positions. Thus, there is great flexibility and adaptability in the positioning of the conveyor, whether for unloading or for transport or storage.

Turning now to the bin support module 12 on which the forward storage bin 13 is mounted, with particular reference to FIGS. 1A and 7, it may be fabricated using conventional techniques from sheet metal. In the illustrated embodiment, the storage bin 13 includes a rectangular upper body hopper portion 40 (FIG. 7) having four upright walls arranged in a rectangular form, and four supporting legs 42, one located in each corner, also formed of sheet metal and bent into an angular form corresponding to the shape of the corners of the corresponding walls providing the upper hopper. In FIG. 7, the support legs are designated 42, and each may be of similar shape and structure.

At the bottom of the upper hopper wall 40, there are formed left and right funnel-shaped discharge areas 44, the bottom of which are open and rectangular, and lead into aligned, rectangular openings (69, 69A in FIG. 8) in a V-shaped conduit 46 having two upper conduit leg portions which converge at the bottom designated 47 in FIG. 1A. A manually operable gate 48 (FIGS. 6 and 8) is hinged above an outlet opening 49 of a discharge spout extending from the bottom 47 of the conduits 46 for controlling the flow of the seed under gravity into the inlet hopper 34 of the unload conveyor 11. Alternatively, the gate 48 may be operated electrically or hydraulically, if desired.

Turning now to FIGS. 5, 6 and 8-10, the bin support module 12 will now be described in detail. As mentioned, however, each bin support module may be the same as the other, so that only one need be described in detail for a full understanding of the invention. Making the bin support modules identical not only reduces the cost of the tender vehicle, but it also enhances its utility because it permits the type of modularity and various arrangements of different size seed bins as shown in FIGS. 1 and 7, and described above.

Figure 5:
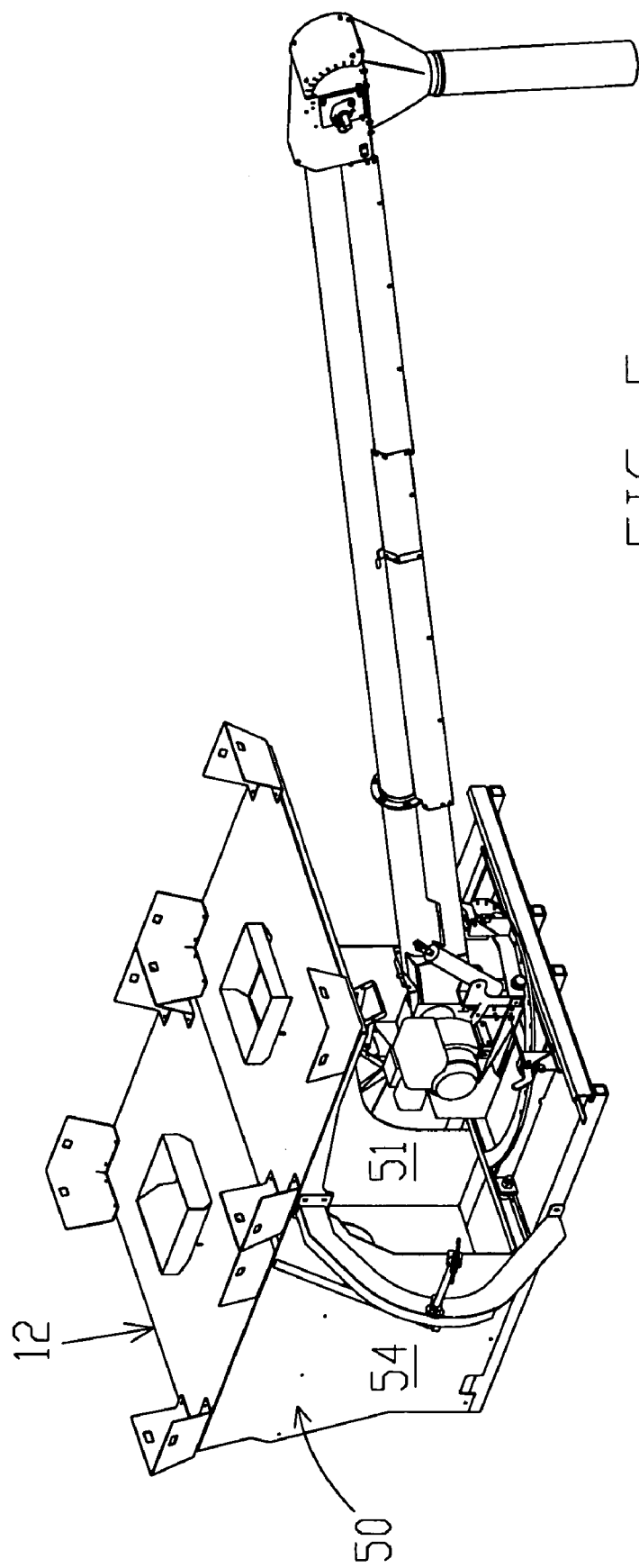
FIG. 5 is a perspective view without the trailer, of the storage and unload module, taken from a forward and upper left side, showing the unload conveyor and its mount, and one modular support structure for the overhead seed storage bin or bins.
Figure 6:
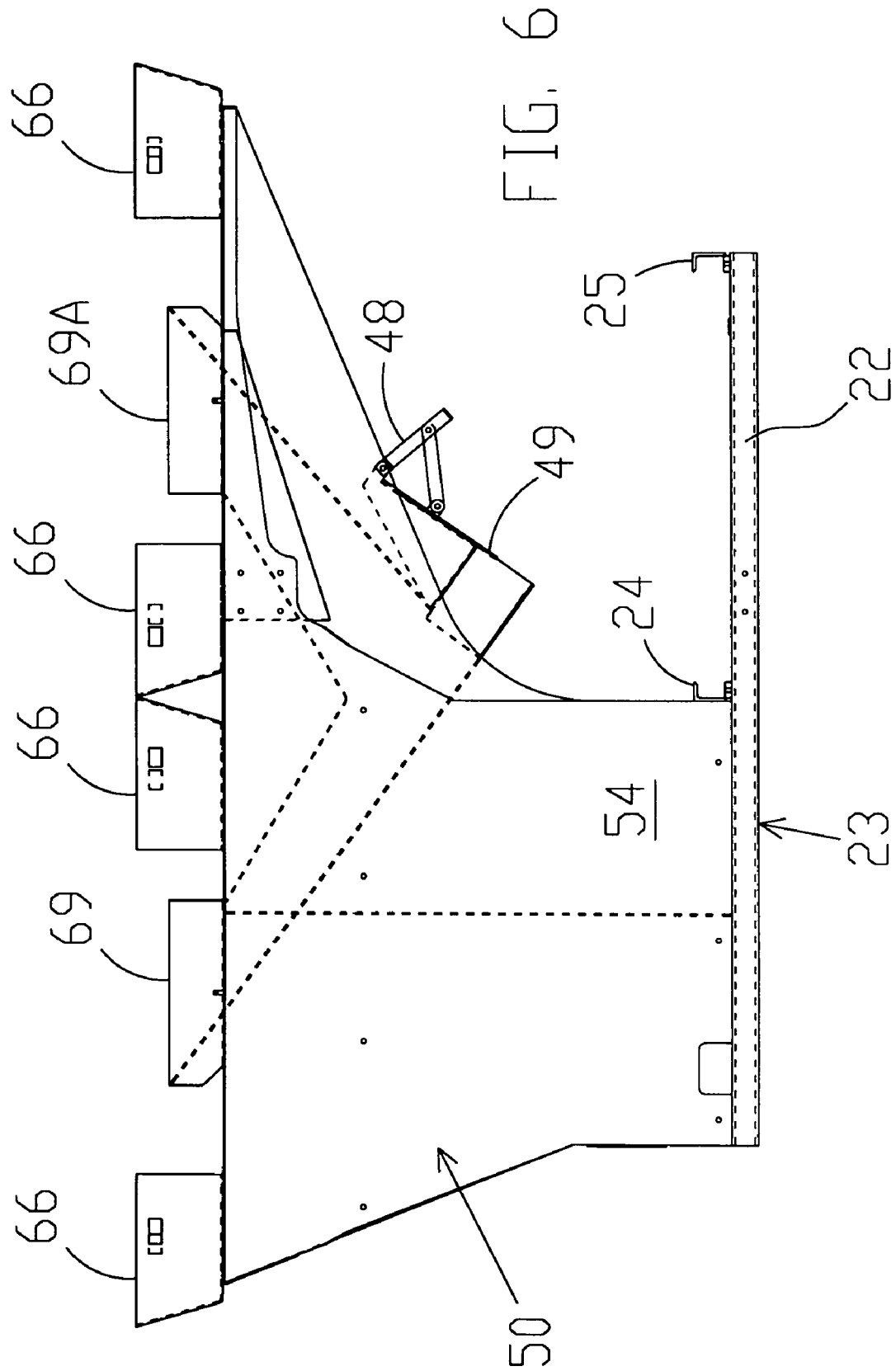
FIG. 6 is a front elevational view of the seed bin support module of FIG. 5.

Turning then to the bin support module 12, it includes a forward wall 50, two intermediate walls 51, 52 and a rear wall 53. Each of the walls 50-53 may be similar in shape, which, as illustrated in FIG. 5, 6 and 8 for the forward wall 50 includes a lower section 54 having a width extending from the right side of the lower transverse superstructure frame 22 (i.e. the left side of FIG. 6) toward the center and immediately adjacent the inboard rail 24. The support wall 50 (and others as well) then extend upwardly and outwardly to brace and support the seed bins. Thus, the upright transverse support walls form openings which are aligned in the direction of travel to provide openings forming a passage or thruway above the rails or tracks 24, 25 to allow the conveyor to move between a forward position (FIG. 1) to a corresponding rear position as can be appreciated from FIGS. 1 and 6, and be located at any intermediate position as well. This leaves the track formed by the rails 24, 25 free for moving the conveyor assembly fore and aft. Above the lower portion 54 of the wall 50, there is an upper portion 55 which extends from the right side of the lower frame 22 over to the left side of the lower frame 22, and above the left rail 25. As seen in FIG. 8, the individual frame members 23 of the lower frame 22 extend from the right side to the left side of the bin support module 12. The lower edges of the walls 50-53 are secured, as by welding, to the right side of the individual frame members 23 of the transverse frame 22 (that is, toward the right side of the inner rail 24).

Figure 9:
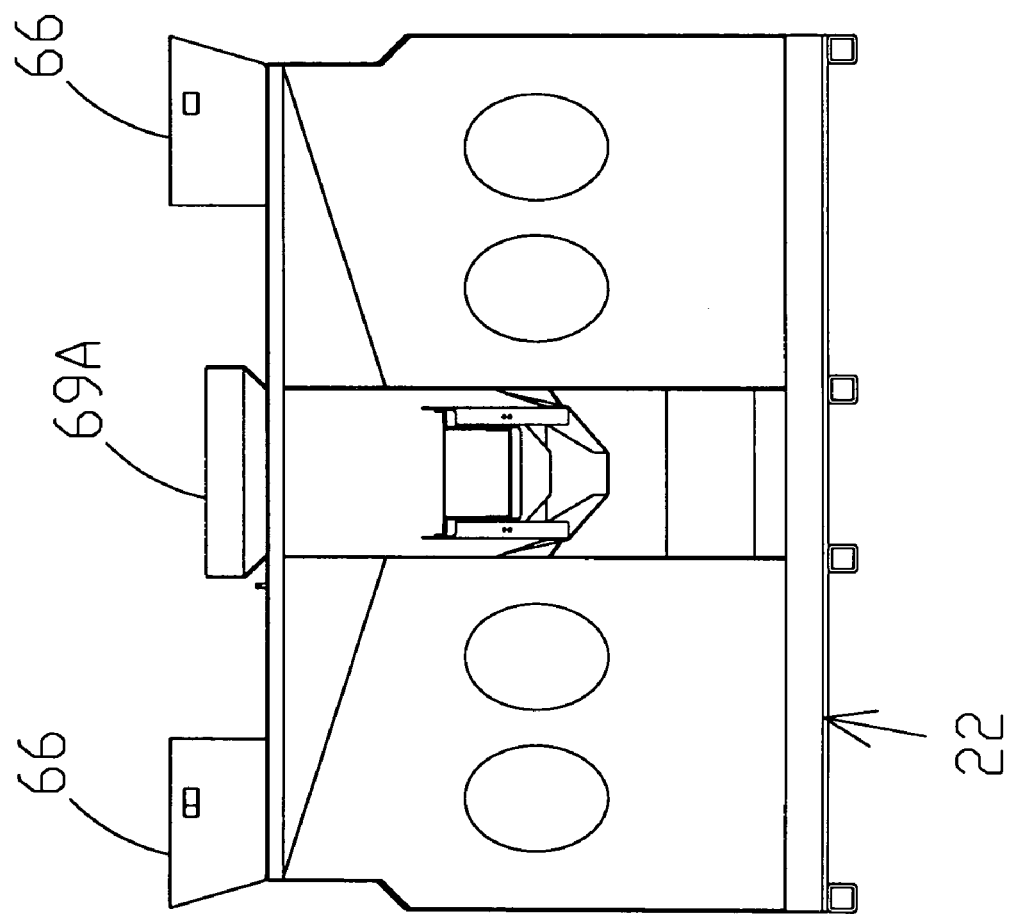
FIG. 9 is a right side view of the seed bin storage module of FIG. 6.

The upper section 55 of the wall 50 (as well as for the other support walls 51-53) extend toward the left (toward the right as FIG. 8 is viewed), to provide a thruway above the track for the passage of the inlet hopper, and base of the conveyor, including the drive motor and turret mount, as best seen in FIGS. 8 and 9. The cantilever upper portions such as that designated 55 in FIG. 8 of the walls 50-53 support the outboard, left side of the seed being stored and transported in the bins on the left side, as will be understood.

Above, and resting on the upper portions of the upright walls 50-53, for each bin support module are right and left base plates or mounting plates, designated respectively 60, 61 in FIG. 8, denoting the right and left base support plates respectively. Each of the base support plates is, in turn, fabricated from sheet metal, and to enhance the modularity of the system, each of the base support plates may be identical. Moreover, the same two base support plates may be used to support a single, larger storage bin such as that designated 13 in the front of the unit in FIG. 7, and the same structure, including two identical base support plates may be used to support the two separate seed storage bins 13A, 13B. Thus, only one base support plate need be described for further understanding 15 of the invention.

Turning then to FIG. 8, each base support plate includes a flat metal plate 65 including corner braces secured at each of the corners, and designated 66, for each corner brace. Depending on the desired configuration, the corner braces may have to be modified slightly. At the center of the plate 65 there is an aperture with a raised rectangular collar designated 69 which receives a shortened downspout from an associated discharge opening of a seed storage bin. The corresponding collar for the left side support brace 61 is designated 69A. As seen in FIG. 1, the two guide collars 69, 69A, are coupled respectively to the upper, input ends of the conduit sections 46 of the V-shaped conduit 47, leading to the input of the conveyor hopper 34.

Turning now to FIG. 2, briefly, it can be seen that each of the two rear storage bins 13A, 13B (seen in vertical cross section) may use the same routing conduit system for handling the seeds in those two bins when the conveyor is moved to the rear station beneath the two rear bins.

As has been mentioned, although two discharge stations are shown in the embodiment of FIG. 7, the invention, particularly due to its modularity, may have three, four or more discharge stations with different combinations of bin styles and shapes and capacities if desired.

It will thus be appreciated that the elevation of the unload conveyor 11 may be adjusted continuously over a wide range of unload heights, so that the system accommodates a number of different applications, from loading grain drills to loading individual hoppers for row crop planters to loading larger central seed storage hoppers on a planter or seed drill which have a higher reach, and can be moved from a forward position, to any side position to a rear position, providing over 180° of lateral flexibility, as well as the vertical adjustment flexibility described.

Having thus disclosed in detail, an illustrated embodiment of the invention, persons skilled in the art will be able to modify certain of the structure which has been illustrated, and to modify certain of the structure which has been disclosed; and it is, therefore, intended that all such modifications and substitutions be covered as they are embraced within the spirit and scope of the appended claims.

We claim:

1. A seed tender comprising:
   a wheeled support vehicle;
   a first support module mounted on said vehicle and defining an elongated first thruway, said first thruway opening to at least one side of said support vehicle;
   a second support module mounted on said vehicle and defining a second elongated thruway extending longitudinally of said second support module, said first and second thruways forming an opening to a lateral side of said support vehicle and partially through a front side and a rear side of said support vehicle, whereby said conveyor may be positioned to extend in front of said support vehicle, to rear of said support vehicle, or adjusted along a lateral side of said support vehicle; and
   a second seed container mounted to said second seed support module;
   at least one seed container mounted to said first support module for storing seed;
   a track mounted to said support vehicle and extending longitudinally of said first thruway;
   a powered conveyor having an input section adapted to receive seed from said seed container for delivering said seed through a discharge end to an outlet;

a turret mounting said conveyor on said track for positioning said conveyor longitudinally of said track and for rotating said conveyor laterally for side adjustment and for adjusting said conveyor vertically for height adjustment of a discharge end.

2. The tender of claim 1 wherein one of said support modules is adapted to support first and second seed containers in side-by-side relation; and wherein first and second seed containers are mounted to said first support module.

3. The tender of claim 1 wherein said support vehicle has a width, and one of said support modules is adapted to support one seed container having a generally rectangular upper inlet and extending laterally substantially the width of said support vehicle.

4. The tender of claim 3 wherein a second of said support modules is adapted to support two seed containers and further including first and second seed containers mounted respectively on said first and second support modules, each container having a generally rectangular upper inlet and together extending laterally substantially the width of said one support module.

5. The tender of claim 4 wherein said first support module includes a lower discharge chute of a contentiously decreasing cross sectional area to funnel the seed contained therein through a discharge opening to an inlet of said conveyor; and further including a door pivotally mounted to close said discharge opening and moveable to an open position to permit seed to flow from a container to an inlet of said conveyor.

6. The tender of claim 1 wherein said first and second support modules each include first and second apertures for passing seed vertically from a seed container, and further comprising:

a conduit for receiving seed from said first and second apertures and delivering seed to said conveyor; and a gate mounted to selectively open and close said conduit for controlling the delivery of seed from said container.

7. The tender of claim 6 wherein said gate is manually controlled.

8. A support module for a seed container and adapted to be mounted to a frame of a vehicle, said module comprising:

at least first and second upright walls extending generally parallel to one another in a forward and a rear position, said first and second walls defining a thruway extending front to rear of said module and opening laterally to one side thereof;

a track extending longitudinally of said thruway;

a horizontal base support wall interconnecting said first and second upright walls and defining first and second laterally spaced discharge openings;

a plurality of connector members for receiving a seed container and removable mounting said seed container to said support vehicle;

a conduit for passing grain from said first and second discharge openings of a seed container to a conveyor carried on said track; and a gate for controlling the flow of seed from said container to a conveyor on said track.

9. The module of claim 8 further comprising a module frame secured to a bottom of said upright walls; and wherein said track includes first and second rails mounted to said module frame.

* * * * *

UNITED STATES PATENT AND TRADEMARK OFFICE
CERTIFICATE OF CORRECTION

| | | |
|---|---|---|
| PATENT NO. | : 7,500,817 B2 | Page 1 of 1 |
| APPLICATION NO. | : 11/348659 | |
| DATED | : March 10, 2009 | |
| INVENTOR(S) | : G. Jason Furrer et al. | |

It is certified that error appears in the above-identified patent and that said Letters Patent is hereby corrected as shown below:

Column 6, line 2, "understanding 15 of the invention" should read --understanding of the invention--

Signed and Sealed this

Second Day of June, 2009

JOHN DOLL
*Acting Director of the United States Patent and Trademark Office*